INVENTOR
Aaron B. Bagsar

Patented Mar. 25, 1947

2,417,901

UNITED STATES PATENT OFFICE 2,417,901

VALVE CONSTRUCTION

Aaron B. Bagsar, Drexel Hill, Pa., assignor to Sun Oil Company, Philadelphia, Pa., a corporation of New Jersey Application June 20, 1944, Serial No. 541,171

1 Claim. (Cl. 251—47)

The present invention in its broader aspects is directed to valves of the reciprocating valve plug or disc type, and it is designed to improve the general efficiency of these valves. More particularly the invention is concerned with valves in which the valve member is disposed in angular relation to the axis of the valve body and which are now commonly referred to as Y-valves.

Valves incorporating features of the invention have general utility in controlling fluid flow, but they are especially useful in handling strong acid or caustic fluids since they are constructed in a manner to prevent leakage after being installed in a fluid line, and yet during use permit packing to be removed and replaced without subjecting an operator or workman to injury from the fluid.

The nature of my invention and the cooperative relation of the several features thereof will hereinafter fully appear, reference being had to the accompanying drawings in which the valve is illustrated in its preferred form, it being understood, however, that changes to the preferred embodiment may be made without departing from the spirit of the invention which is to be limited only by the appended claim.

Referring to the drawings.

Figure 1:
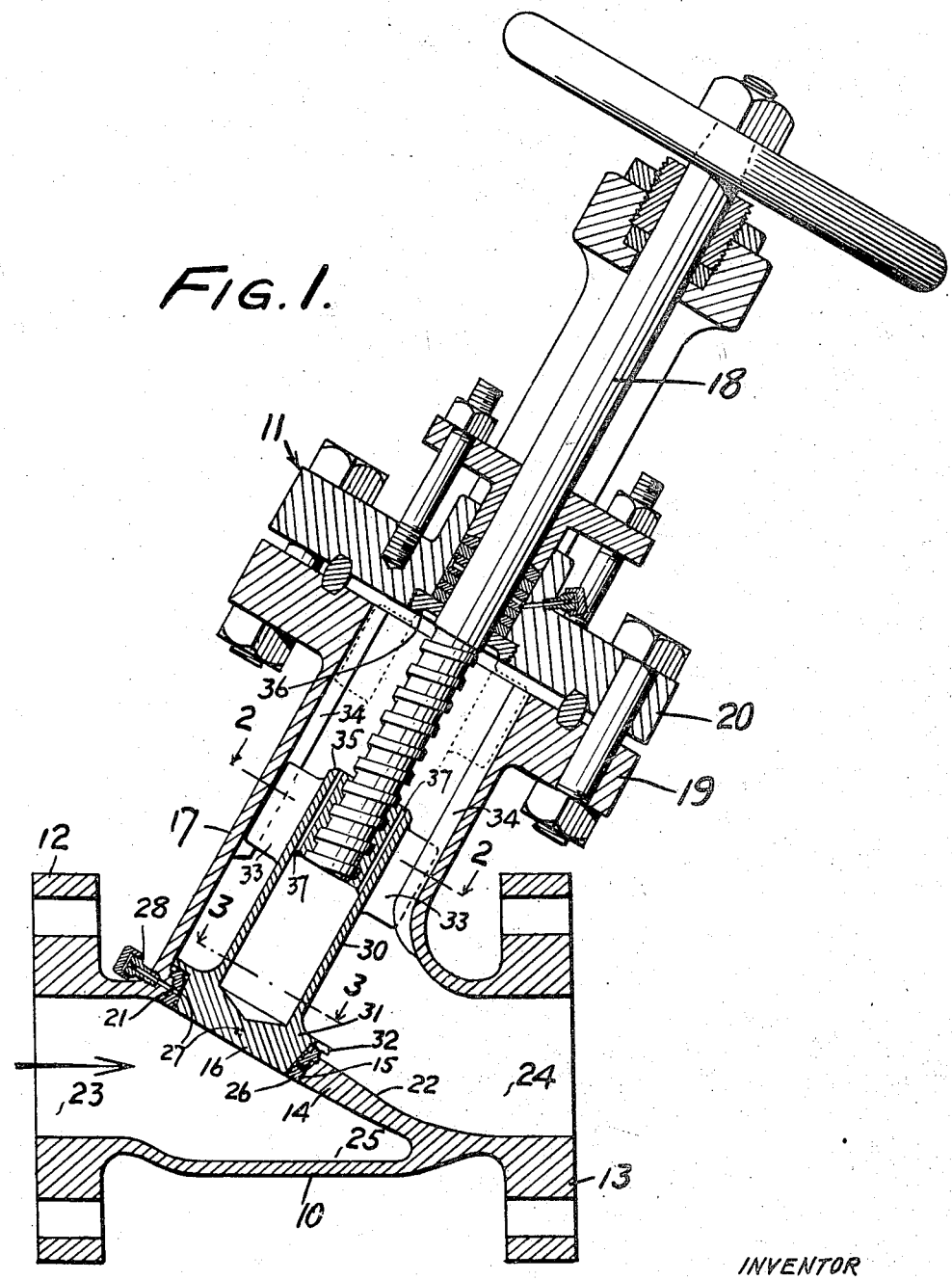
Figure 1 is a central section through the valve assembly.

In Figure 1 the valve assembly comprises the body or casing generally indicated at 10, and a bonnet section generally indicated at 11. The valve casing is provided with the usual flanges 12 and 13 for connecting the casing to a fluid line. A partition 14 extends across and divides the casing into complemental inlet and outlet sections and is provided with an aperture 15 to receive a valve member 16 which is reciprocable within a housing generally indicated at 17 extending laterally from the valve casing. The valve member 16 is actuated to seated and unseated position through a valve stem 18, having one end extending into the housing 17, and its other end positioned exteriorly of the bonnet section 11 of the valve assembly, to be manually or motor operated. The housing 17 is provided with a flange 19 to which the bonnet section 11, of the valve assembly is secured through flange 20. Packing is provided around the valve stem 18 in the bonnet section of the valve assembly in the usual manner to prevent leakage.

In the particular embodiment disclosed in Figure 1, the partition 14 is shown as extending at an angle across the casing 10, and the aperture 15 is positioned off center in the partition forming with the periphery of the partition a narrow web portion 21 adjacent the top of the casing, and a wide web portion 22 adjacent the bottom of the casing. In this particular embodiment of the invention the partition 14 forms a definite inlet section 23 and a definite outlet section 24 in the valve casing. The web portion 22 of the partition, due to its substantial width and angle of disposition, forms with the bottom of the valve casing a trap or pocket 25, which is positioned directly in the path of flow of the fluid entering the inlet 23, and functions as a depository for any foreign matter picked up and carried along in the fluid line, and due to the depth of the pocket, any foreign matter deposited therein will be prevented from flowing through the outlet of the valve.

Figure 5:
Figure 5 is a sectional view taken on the line 5—5 of Figure 4.

A removable valve seat 26 is secured in the aperture 15 and is suitably machined and shaped to receive the valve member 16 in tight-fitting engagement. In order to provide a seal between the valve seat and valve member, an aperture extends through the housing 17 and through the narrow web portion 21 which communicates with aperture 27 in the valve seat 26, shown in detail in Figure 5, to receive lubricant admitted through the fixture 28. As indicated in Figure 5 the valve seat is provided with a plurality of circumferential grooves 29 which will receive the lubricant, and in the event of abrasion or deformation of the face of the valve plug 16 during use, the lubricant will pass from the grooves in the seat to any depressions formed in the valve member to effect a seal. It will be appreciated of course, that grooves may as well be provided in the face of the valve member to receive the lubricant and effect a seal in any depressions formed in the valve seat.

Figure 3:
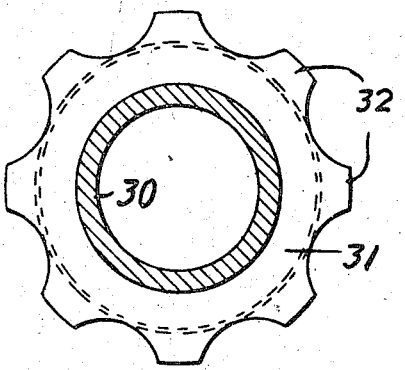
Figure 3 is a sectional view from the line 3—3 of Figure 1.
Figure 4:
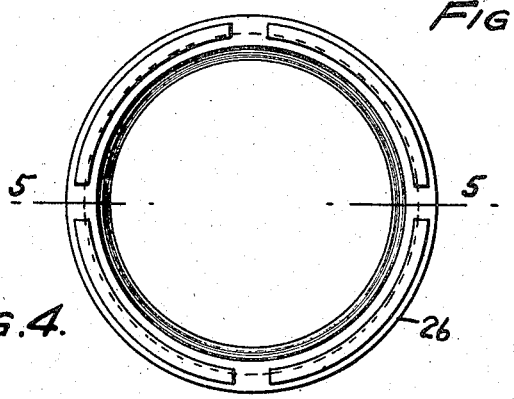
Figure 4 is an enlarged view of a detail of the valve assembly of Figure 1.

In Figure 1 the particular valve member 16 is provided with a hollow extension 30, screw-threaded at its upper end to adapt it for use with a non-rising stem. Reciprocation of the valve member is effected through the screw-threaded portion of the valve stem 18, which during seating and unseating of the valve moves into and out of the hollow extension. In order to prevent wobbling or chattering of the valve member and maintain it in true alignment with the valve seat 26, during reciprocation a plate or flange 31 is formed integral with the plug as shown or separately formed and disposed at the top of the plug to be moved therewith. The flange 31 is adapted to slidably engage the inner wall of housing 17 during reciprocation and as shown in one form in Figure 3, is designed to provide a plurality of fingers 32 extending circumferentially of the flange and make line contact with the inner wall of the housing circumferentially thereof to maintain the plug substantially rigid during movement, or when the valve is opened to throttled position.

Figure 2:
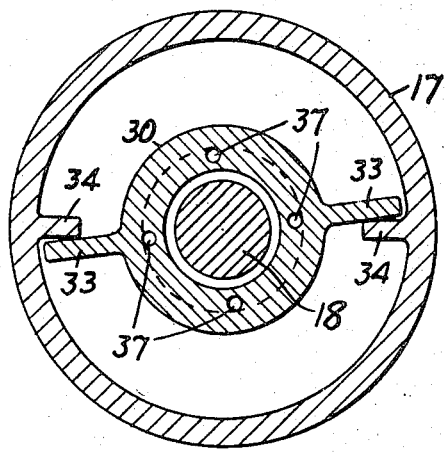
Figure 2 is a sectonal view on the line 2—2 of Figure 1.

In order to prevent any accumulation of matter which might be injurious to the valve seat or face of the valve plug, means is provided to effect a wiping action between the valve plug and its seat after the plug is in seated position. In order to accomplish this, one or more lugs 33 are provided on the hollow extension 30 to cooperate with one or more ribs 34 extending from the inner wall of the housing 17, as shown in detail in Figure 2. Referring to Figure 2 it will be seen that the lugs and ribs are arranged 180° apart on the plug extension and housing respectively and are so relatively positioned as to permit the valve plug to move through an arc of substantially 180°. When the plug is seated, rotation of the stem 18, due to frictional engagement of the plug and seat, will cause the plug to move through an arc defined by the positional arrangement of the lugs and ribs and remove any accumulated matter. It will be appreciated that a single lug and its cooperating rib could be utilized and the plug moved through an arc of substantially 360°.

As indicated in Figure 1, the top of the plug extension is chamfered at 35 to cooperate with chamfer 36 on the packing-retaining ring in the bonnet section of the valve assembly. When the valve plug is completely retracted from seated position the chamfer 35 of the extension effects a seal with the chamfer 36 of the retaining ring and permits the packing in the valve bonnet to be removed and replaced while the valve is in use. The lug and rib arrangement heretofore described permits the chamfered areas of the elements to be cleaned in a manner similar to that pointed out in connection with the valve seat.

When the valve is in use any liquid which accumulates in the hollow portion of the valve plug extension is removed through a plurality of apertures 37 which extend axially of the extension to be in communication with the hollow portion, and as the valve stem moves into the extension the liquid is ejected therefrom through the valve housing and into the valve casing.

I claim:

A valve body comprising a casing having a tubular bore, a housing extending from said casing and communicating with the tubular bore, a partition extending across and dividing the tubular bore into a fluid inlet and a fluid outlet section, an aperture in said partition forming a valve seat and providing communication between said inlet and outlet sections, a valve plug member cooperating with said valve seat and including a hollow extension positioned within said housing and provided with an internal screw-threaded area, a cooperating screw-threaded shaft, means extending from said housing and other means extending from said hollow extension for cooperating in effecting the reciprocation of the valve plug member within the housing during rotation of the screw-threaded shaft while permitting a rotative movement of the valve plug member through a predetermined arc prior to its reciprocative movement, and flange means extending laterally from said valve plug member and movable therewith to slidably engage said housing wall and maintain said valve plug member during its reciprocative movement in true alignment with the valve seat.

AARON B. BAGSAR.

REFERENCES CITED

The following references are of record in the file of this patent:

UNITED STATES PATENTS

| Number | Name | Date |
| --- | --- | --- |
| 68,733 | Grant | Sept. 10, 1867 |
| 695,588 | Storle | Mar. 18, 1902 |
| Re. 4,762 | Adams | Feb. 20, 1872 |
| 1,012,067 | Emrick | Dec. 19, 1911 |
| 1,245,735 | Keliher | Nov. 6, 1917 |
| 1,579,776 | Monteagle | Apr. 6, 1926 |
| 1,689,799 | Nordstrom | Oct. 30, 1928 |
| 1,946,236 | Riley | Feb. 6, 1934 |
| 862,176 | Love | Aug. 6, 1907 |

FOREIGN PATENTS

| Number | Country | Date |
| --- | --- | --- |
| 152,869 | German | 1904 |